(12) United States Patent
Smith

(10) Patent No.: US 9,234,809 B2
(45) Date of Patent: Jan. 12, 2016

(54) DIFFERENTIAL DEFLECTION MEASUREMENT IN STRUCTURAL MEMBERS

(75) Inventor: David Edward Smith, Halesowen (GB)

(73) Assignee: ILLINOIS TOOL WORKS INC., Glenview, IL (US)

( * ) Notice: Subject to any disclaimer, the term of this patent is extended or adjusted under 35 U.S.C. 154(b) by 36 days.

(21) Appl. No.: 14/003,218

(22) PCT Filed: Mar. 16, 2012

(86) PCT No.: PCT/IB2012/051271
§ 371 (c)(1),
(2), (4) Date: Sep. 4, 2013

(87) PCT Pub. No.: WO2012/127390
PCT Pub. Date: Sep. 27, 2012

(65) Prior Publication Data
US 2014/0000387 A1 Jan. 2, 2014

(30) Foreign Application Priority Data

Mar. 22, 2011 (GB) .................................. 1104777.6

(51) Int. Cl.
*G01L 1/04* (2006.01)
*G01L 1/22* (2006.01)
(Continued)

(52) U.S. Cl.
CPC ................ *G01L 1/22* (2013.01); *G01G 3/1402* (2013.01); *G01G 19/042* (2013.01); *G01G 19/047* (2013.01); *G01L 1/2243* (2013.01); *Y10T 29/49826* (2015.01)

(58) Field of Classification Search
CPC . G01G 19/047; G01G 3/1402; G01G 19/042; G01L 1/2243
USPC ........ 73/862.621, 862.627, 862.632, 862.634
See application file for complete search history.

(56) References Cited

U.S. PATENT DOCUMENTS 3,985,025 A * 10/1976 Ormond ......................... 177/255
4,009,608 A * 3/1977 Ormond ......................... 177/211
(Continued)

FOREIGN PATENT DOCUMENTS

DE 202008014923 U1 3/2009
GB 1534276 A 11/1978
(Continued)

OTHER PUBLICATIONS

An International Search Report and Written Opinion, dated Jul. 23, 2013, issued in International Application No. PCT/IB2012/051271.
(Continued)

*Primary Examiner* — Max Noori
(74) *Attorney, Agent, or Firm* — Hauptman Ham, LLP

(57) ABSTRACT

The invention relates to a deflection measuring device for measuring differential vertical deflection between first and second discrete points in response to the application of force to the device, the device comprising a transducer attachable to a structural member and comprising at least one strain responsive element, the transducer being operable to resolve any force applied thereto into a differential vertical deflection between a first point and a second point on the transducer when a load is applied thereto; the strain responsive element being operable to measure the differential vertical deflection in the transducer.

28 Claims, 9 Drawing Sheets

(51) Int. Cl.
*G01G 3/14* (2006.01)
*G01G 19/04* (2006.01)

(56) References Cited

U.S. PATENT DOCUMENTS

| | | | | |
|---|---|---|---|---|
| 4,042,049 | A | * | 8/1977 | Reichow et al. .............. 177/137 |
| 4,260,034 | A | * | 4/1981 | Randolph, Jr. ................ 177/211 |
| 4,276,772 | A | * | 7/1981 | Ferguson ....................... 73/862 |
| 4,306,460 | A | * | 12/1981 | Sakurai et al. .................. 73/721 |
| 4,542,800 | A | * | 9/1985 | Knothe et al. ................ 177/211 |
| 4,558,756 | A | * | 12/1985 | Seed .............................. 177/211 |
| 4,653,329 | A | * | 3/1987 | Sagara et al. .................... 73/726 |
| 4,785,896 | A | * | 11/1988 | Jacobson ....................... 177/211 |
| 5,063,785 | A | * | 11/1991 | Labuz et al. .................... 73/821 |
| 5,668,324 | A | * | 9/1997 | Voss et al. ....................... 73/800 |
| 5,929,391 | A | * | 7/1999 | Petrucelli et al. ............. 177/211 |
| 6,990,867 | B2 | * | 1/2006 | Okada ............................. 73/780 |

FOREIGN PATENT DOCUMENTS

| | | |
|---|---|---|
| GB | 2043906 A | 10/1980 |
| GB | 2216671 A | 10/1989 |
| JP | 55106330 A | 8/1980 |
| JP | 07128157 A | 5/1995 |
| JP | 09288019 A | 11/1997 |
| JP | 2002357492 A | 12/2002 |
| WO | 2006042368 A1 | 4/2006 |
| WO | 2007140378 A2 | 12/2007 |

OTHER PUBLICATIONS

Corresponding GB Application No. GB1104777.6 Search Report dated Dec. 28, 2011.

* cited by examiner

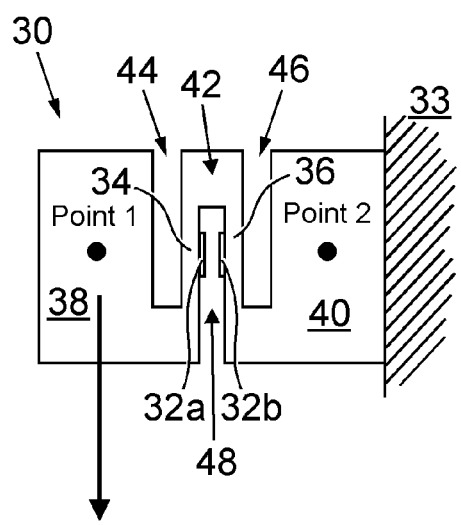
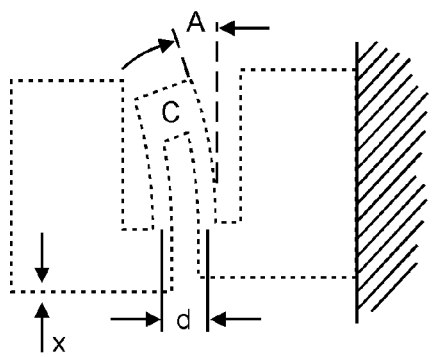
Fig. 2a
Fig. 2b
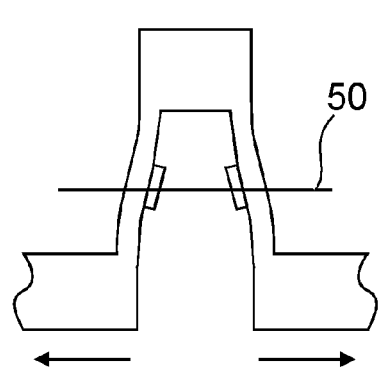
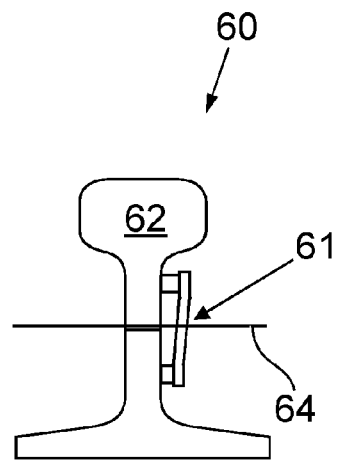
Fig. 3a
Fig. 3b

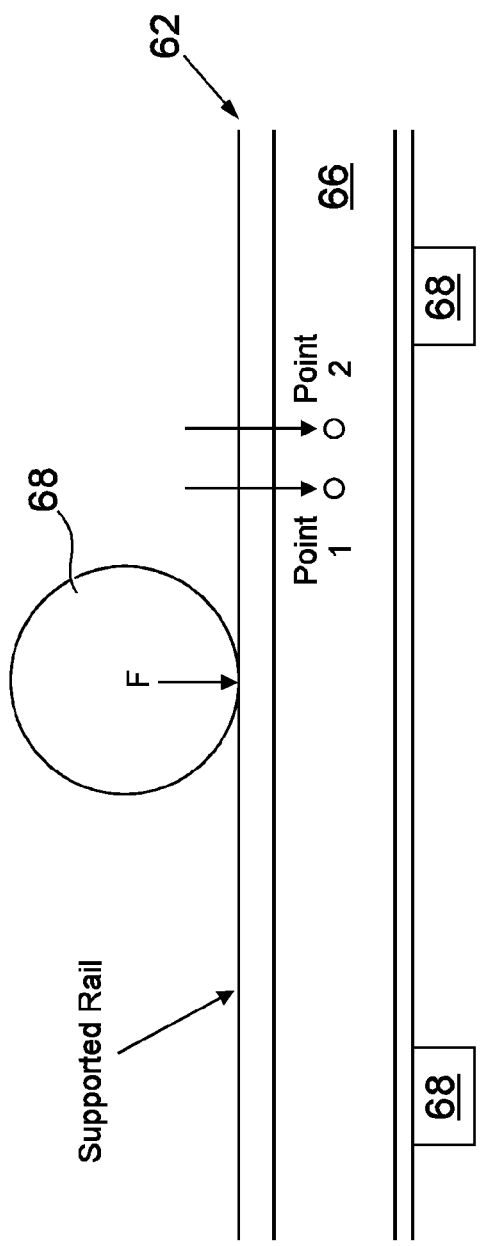
Fig. 4
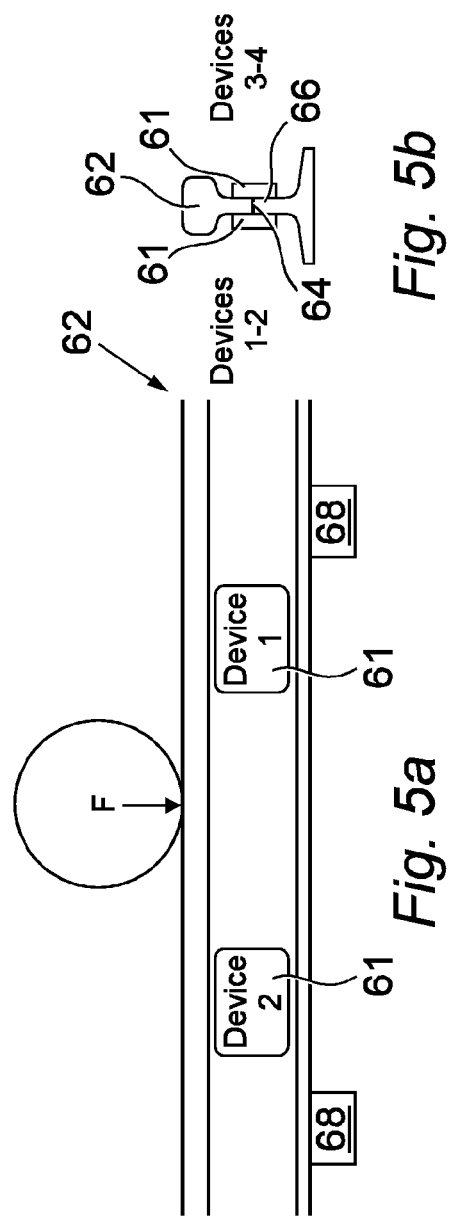
Fig. 5a
Fig. 5b

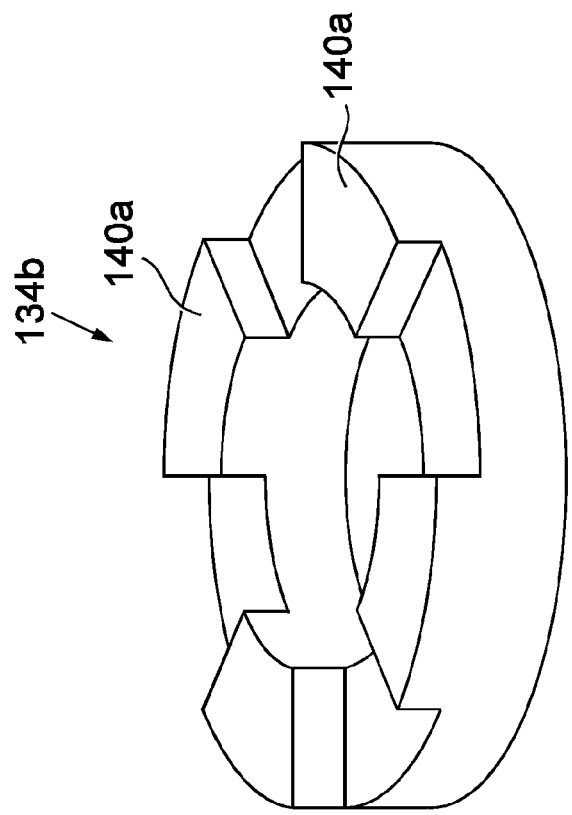
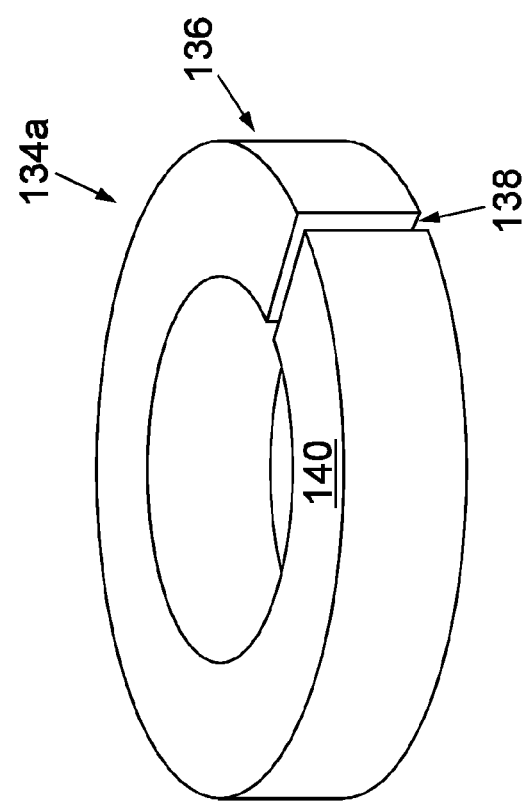
Fig. 11b
Fig. 11a

DIFFERENTIAL DEFLECTION MEASUREMENT IN STRUCTURAL MEMBERS

RELATED APPLICATIONS

The present application is a National Stage of International Application No. PCT/IB2012/051271 filed Mar. 16, 2012 and claims priority from, United Kingdom Application No. 1104777.6 filed Mar. 22, 2011.

The present invention relates to a deflection measuring device and, in particular but not exclusively, to a device for measuring differential vertical deflection in response to the application of force to a structural member. More specifically, the invention relates to a device operable to determine differential vertical deflection between discrete points to determine the wheel force applied to a rail in railway applications.

Heretofore various attempts have been made to utilise strain gauges in situ to measure mechanical stresses occurring in a structural member, such as rails in railway applications, in response to an applied load. In some such applications, exemplified in GB2216671A, strain gauges, in the form of shear gauges, are bonded directly to the structural member, either in the factory or in situ, in order to measure mechanical shear strain in the structural member. The transducer described in GB2216671A is constrained only to measure shear strain in the rail to which it is attached. The transducer so constrained must, therefore, ignore any torsional or bending moments in the rail. Further problems arise due to the requirement for a virtual clean-lab environment when working in situ and also due to the expense of manufacturing large structural members with the strain gauges applied in the factory as the member must be transported to the necessary location and fitted in situ.

Alternative solutions have provided for direct measurement of mechanical stresses in a structural member whereby a hole is provided in the web of the structural member and a strain measuring device is driven into the hole. The strain detected by the device is then a measurement of the deformation in the diameter of the hole in response to an applied load. Indirect measurement of the mechanical stresses induced in a structural member when a load is applied thereto using a "bolt-on" device attachable to the structural member has been previously attempted.

WO2006/042368 provides one such device in which one or more strain gauges may be bolted onto a structural member, such as a rail or the like. The device described is, however, limited to the measurement of shear stresses in the structural member and is incapable of resolving all forces, including bending moments, applied to and occurring in the structural member.

It is, therefore, an aim of the present invention, to obviate one or more of the disadvantages of the prior art.

In a first aspect the present invention provides a deflection measuring device for measuring differential vertical deflection between first and second discrete points in response to the application of force to the device, the device comprising a transducer attachable to a structural member and comprising at least one strain responsive element, the transducer being operable to resolve any force applied thereto into a differential vertical deflection between a first point and a second point on the transducer when a load is applied thereto; the strain responsive element being operable to measure the differential vertical deflection in the transducer.

It is much preferred that the transducer is unconstrained against shear, bending and torsional deflection. In this way, the device of the present invention is operable to resolve any and all forces applied to and occurring in a structural member to which the transducer is attached.

The device is operable to respond to any force applied to it and to resolve same into a vertical displacement of the first and/or the second point on the transducer. The relative vertical displacement between the first and second points is then measured by the strain responsive element.

For example, forces derived from an applied load and occurring in a structural member to which the device is attached are detectable by the transducer as same is subjected to the forces occurring in the structural member. The transducer is operable to resolve those forces into a relative vertical displacement of two discrete points on the transducer. It is the differential vertical displacement between the two discrete points which is measured in order to calculate the load applied to the structural member.

More specifically, the transducer is configured to be capable of torsional, bending and shear deflection. More specifically, the transducer is arranged to resolve any one or more of torsional, axial, bending and shear forces occurring within it into a differential vertical deflection between two discrete points on the transducer.

In embodiments, the transducer comprises a first loading member and a second loading member coupled together and capable of relative vertical and torsional deflection with respect to one another, a first flexure element and a second flexure element coupled to the first and the second loading member respectively and connected to one another by a connecting portion and being arranged to deform in response to the relative vertical deflection between the first and the second loading members. In such embodiments the strain responsive element is coupled to the first and second flexure elements and is operable to detect the deformation therein.

It is much preferred that the first flexure element and the second flexure element are capable of deformation by way of a constant bending moment in response to the relative vertical deflection between the first and the second loading members.

In embodiments, the transducer is formed of a plate attachable to a structural member. The forces applied to the plate are resolved into a differential vertical displacement between first and second points on the plate. In such embodiments, the differential vertical deflection in the plate is then measured by the strain responsive element.

In embodiments of the invention the transducer is formed of a block of material.

In embodiments, the plate or the block of material is formed with the first and the second loading members coupled together by first and second flexure elements united by a connecting portion at one of their ends and each being connected to a respective loading member at the other of their ends.

Thus, the first flexure element is connected to the first loading member at an end opposite the connecting portion and the second flexure element is connected to the second loading member at an end opposite the connecting portion.

Preferably the block of material or plate further comprises a pair of parallel elongate recesses in and perpendicular to a top edge of the block of material or plate and an elongate recess in and perpendicular to an opposing bottom edge thereof, the recesses being configured so as to form the two loading members coupled together by first and second flexure elements united by a connecting portion at one of their ends and each of which are connected to a respective loading member at the other of their ends. In this way, the loading members of the transducer are unconstrained against torsional, bending and shear forces relative to one another. As a result, the transducer is arranged to resolve all forces acting on the loading members and is not limited to measuring only shear strain between the loading members.

In embodiments, the transducer comprises two parallel loading members spaced apart from one another but interconnected by a central block, the central block being generally U-shaped with the arms of the U-shape being formed by the first and second flexure elements connected at an end thereof by a connecting portion which forms the base of the U-shape, at their opposite ends each flexure element is connected to one loading member.

A vertical deflection applied to the transducer causes deflection of the first and second loading members relative to one another which in turn is resolved into a differential vertical deflection between the first and second points on the transducer. The differential vertical deflection causes the central block of the transducer to deflect laterally about its ends adjacent the loading members. The deflection may then be measured by any suitable strain responsive element.

Thus, both the first and the second loading members are deflected upon application of a vertical deflection to the transducer, the deflection in the loading members is resolved into a differential vertical deflection between the first and the second points on the loading members causing the lateral deflection in the first and second flexure elements.

Preferably a first point located on the first loading member is deflected vertically downwards relative to a second point located on the second loading member in response to a force applied to the transducer. In this way, the strain responsive element is operable to detect the bending deflection in the flexure elements resulting from the relative vertical deflection between the first point and the second point on the transducer.

In embodiments, the first and the second points may be located on the neutral axis of the block of material or plate forming the transducer. Even more specifically, the first and second points and the strain responsive element are located on the neutral axis of the block of material or plate forming the transducer. The neutral axis is a transverse axis parallel to the top and bottom edges of the block of material or plate forming the transducer. In this way, the transducer is able to ignore horizontal (axial) and torsional deflections in the block of material or plate forming the transducer. This is achieved by locating the strain responsive element on the neutral axis of the transducer thus, any transverse/horizontal or torsional force will have a neutral affect on the output of the strain responsive element.

When the transducer is attached to a structural member, the first loading member and the second loading member are arranged to respond to vertical deflections applied to them from the structural member when a load is applied thereto. The first and second loading members may bend, shear or twist relative to one another and are configured to resolve those moments of force into a differential vertical displacement between a first point on the first loading member and a second point on the second loading member. In this way, any relative movement of the first and second loading members of the transducer is resolved into a differential vertical displacement between the first and second points on the loading members. Thus, the transducer is operable to detect any force applied to it and to resolve same into relative vertical deflection of the first and second loading members.

The first and second loading members are preferably deflected relative to one another in response to shear, torsional and/or bending forces applied to the transducer from a structural member when a load is applied to the structural member.

The strain responsive element may be any suitable measuring device operable to detect and measure the differential vertical deflection in the transducer.

In embodiments the strain responsive element is a displacement transducer. More specifically, the displacement transducer is operable to detect the differential vertical deflection between the first and second points on the transducer when a load is applied thereto. The output of the displacement transducer is proportional to the load applied to the transducer. Thus, the device is operable to detect load applied to a structural member and to resolve same into a measurable differential vertical deflection between two discrete points on a transducer as opposed to measuring the mechanical strain in the structural member.

The strain responsive element may be a strain gauge. More specifically, the strain responsive element may be a plurality of strain gauges. Even more specifically, the strain responsive element may be one or more pairs of strain gauges.

The strain responsive element is preferably a pair of strain gauges. More specifically, the pair of strain gauges is located close to the neutral bending point (measuring element centre) of the flexure elements of the transducer. In this way, if horizontal deflection is encountered the pair of strain gauges respond in a neutral way, that is to say, the net output of the pair of strain gauges is neutral, thus minimising any measurement error due to horizontal deflection.

The strain gauges are preferably affixed to the first and the second flexure element. In this way, each strain gauge is located to detect deflection in the flexure element to which it is attached. As the flexure elements are deflected laterally in response to a load applied to the transducer, one of the strain gauges will be placed under tension and the other under compression. The outputs of the strain gauges are then electrically connected to form a half Wheatstone bridge arrangement the output of which is proportional to the deflection detected.

In preferred embodiments, the strain gauges are affixed to the inner surface of the first and the second flexure element respectively.

When a single strain gauge forms the strain responsive element, the output of same forms a quarter Wheatstone bridge. When a single pair of strain gauges forms the strain responsive element the output of same forms a half Wheatstone bridge. When the strain responsive element is formed of two pairs of strain gauges, the output of same will form a full Wheatstone bridge.

In a second aspect the present invention provides a load measuring assembly comprising a deflection measuring device and a structural member to which the deflection measuring device is attached, the deflection measuring device comprising a transducer attached to the structural member and comprising at least one strain responsive element, the transducer being operable to resolve any force applied thereto from the structural member into a differential vertical deflection between a first point and a second point on the transducer when a load is applied thereto; the strain responsive element being operable to measure the differential vertical deflection in the transducer.

It is much preferred that the transducer is unconstrained against shear, bending and torsional deflection. In this way, the device is operable to resolve any and all forces applied to and occurring in the structural member to which the transducer is attached.

Preferably the deflection measuring device of the second aspect is according to the first aspect of the invention.

The transducer is preferably attached to the structural member by a coupling element.

More specifically the coupling element may be one or more of a bolt, rivet, weld, adhesive or the like.

In preferred embodiments, the coupling element comprises a plurality of bolts.

Each bolt may be a threaded bolt securable to the structural element by a nut. More specifically the threaded bolt is securable to the structural element by a nut and locked into position by a further locking nut.

In order to precisely translate the forces occurring in the structural member to the transducer, the assembly may further comprise a spacer element therebetween. More specifically the spacer element may be locatable in contact with the surface of the structural member and be capable of elastic deformation in response to forces applied to it from the structural member.

In embodiments comprising a spacer element, the spacer element is preferably in contact with the coupling element between the transducer and the structural member.

In embodiments wherein the coupling element comprises one or more bolts, the spacer element is preferably a washer configured to circumscribe the bolt shaft circumference and be in contact therewith. Preferably the washer is configured to circumscribe the bolt shaft circumference and be in intimate contact therewith.

More specifically, the diameter of the washer aperture may be smaller than the diameter of the bolt shaft. In such arrangements the washer is press fit or force fit onto the bolt shaft.

Even more specifically, the washer may comprise a discontinuous circumference. In this way, the diameter of the aperture in the washer may be temporarily increased as the washer is pushed onto the bolt shaft in order to locate same together. The washer aperture diameter will reduce in situ on the bolt shaft circumference to be in contact thereabout.

Alternatively or, in addition, the washer may comprise a discontinuous planar annular surface whereby the washer surface will contact the structural member at spaced locations about an annulus.

It is much by preference that the surface of the structural member circumscribing the hole in the structural member through which the bolt is received is spot faced before the bolt is located therethrough. Spot facing is a technique well known in the art whereby the surface of the structural member peripheral to the hole therein is machined away to form a counter-bore in the structural member to remove curvature and irregularities in the surface of the structural member. By forming a counter-bore in the surface of the structural member, the washer surface need not be spaced from the bolt shaft circumference, as there is no requirement for room between the washer inside surface and the bolt shaft circumference to provide stretch or deforming of the washer which would otherwise address a curved or irregular structural member surface.

The counter-bore in the surface of the structural member circumscribing the hole therein then provides a clean, planar surface perpendicular to the neutral axis of the structural member. A washer surface surrounding the bolt may be located into the counter-bore. In this way, the washer surface is in contact with the clean, planar surface of the structural member provided by the counter-bore. By spot facing the surface of the structural member in contact with the washer surface, the contact between the washer surface and the counter-bore in the structural member provides elastic deformation of the washer in response to forces transmitted through the washer to the bolt in response to load applied to the structural member.

The washer may be of any suitable configuration. In preferred embodiments the washer surface is an annular, planar surface extending about the entire periphery of the counter-bore in the structural member.

More specifically, the annular planar surface of the washer is arranged to completely and continuously contact the counter-bore surface of the structural member.

The washer preferably comprises an annular planar surface opposing the annular planar surface configured to contact the counter-bore surface of the structural member. The opposing annular planar surface is arranged to completely and continuously contact the surface of the transducer.

In embodiments of the invention the transducer is formed of a quadrangular block of material. More specifically the quadrangular block of material is bolted onto the structural member at its four corners.

Preferably the transducer is aligned on or about the neutral axis of the structural member and is operable to detect all forces in the structural member as a load is applied to the structural member. By positioning the transducer, and the strain responsive element(s) thereof in particular, on the neutral axis of the structural member, axial forces in the transducer can be ignored as having a neutral effect on the strain responsive element(s).

In preferred embodiments, the load measuring assembly comprises a first deflection measuring device and a second deflection measuring device attached on or about the neutral axis of the structural member and longitudinally spaced apart from one another, each of said first and said second deflection measuring device comprising at least one strain responsive element operable to detect a vertical deflection in the transducer resulting from a force applied to the structural member.

Preferably each deflection measuring device is according to the first aspect of the present invention.

In the first and second aspects of the invention, it is much preferred that the structural member is a rail. More specifically the rail is a railway rail.

Preferably the load measuring assembly is an axle load measuring assembly for a railway. More specifically, the axle load measuring assembly comprises two pairs of differential deflection measuring devices according to the first aspect of the invention located in predetermined spaced configuration along the railway, each differential deflection measuring device of each pair being located together in side by side relation, one on each rail secured to the web thereof.

By providing two deflection measuring devices spaced longitudinally along the structural member, the accuracy of measurement of the load applied to the structural member is increased. In embodiments where the structural member is a rail upon which load is exert by a wheel, by providing two deflection measuring devices spaced longitudinally along an unsupported section of rail, the exact positioning of the wheel on the rail between the two deflection measuring devices becomes a much reduced factor in the accuracy of the measurement.

In various embodiments, a first deflection measuring device is located on a first face of the structural member and a deflection second measuring device is located on an opposing face of the structural member. In such embodiments it is preferred that the first and the second deflection measuring devices are each located on or about the neutral axis of the structural member. It is even more preferable that the first and the second deflection measuring devices are located on or about the neutral axis of the structural member at the same longitudinal position on the structural member. In this way, inaccuracies due to side forces on the structural member due to an applied load can be reduced by duplicating the differential deflection measurement on opposing sides of the structural member and summing the measurement outputs.

The deflection measuring device(s) may be attached to the structural member by any suitable means such as bolts, rivets, welds, adhesive or the like.

The transducer(s) is configured to facilitate resolution of all forces resulting within a structural member whilst being locatable on the structural member such that horizontal and torsional forces applied to the transducer have a neutral impact on the output of the strain responsive elements. Overconstraint of the flexure elements in a transducer results in one or more forces associated with the deflection occurring in the transducer being ignored completely in the subsequent measurement of the applied load. For example, the configuration of measuring device described in WO2006/042368 is capable only of measuring shear stresses in a structural member and must ignore bending and direct stresses applied to the device. Likewise, the force transducer described in GB 2 043 906A is constrained to allow the loading members to move in only a predetermined direction thereby forcing the device to ignore some of the applied force. The transducer of the present invention is configured to resolve all forces applied to it in order to provide a more accurate measurement of applied force in different circumstances and applications.

According to a third aspect the present invention provides a deflection measuring kit for assembly to form a deflection measuring device for measuring differential vertical deflection between first and second discrete points in response to the application of force to the device from a structural member, the kit comprising four nuts and bolts, a transducer formed of a block of material and having four bolt holes therethrough and at least one strain responsive element affixed to the block of material, four structural member spacer elements each having an annular surface to contact the structural member and the bolt shaft circumference of one of said bolts.

The strain responsive element may be one or more strain gauges.

Alternatively or, in addition, the strain responsive element may be a displacement transducer.

The kit may further comprise four locking nuts. In this way, the nuts and bolts for attaching the transducer to the structural member may be locked in position.

According to a fourth aspect the present invention provides a method of measuring a load applied to a structural member, the method comprising the steps of providing a deflection measuring device according to the first aspect of the invention, attaching the deflection measuring device on or about the neutral axis of a structural member, applying a load to the structural member thereby inducing a differential vertical deflection between first and second points on the transducer of the differential measuring device, measuring the differential vertical deflection in the transducer using a strain responsive element and determining the applied load from the output of the strain responsive element.

According to a fifth aspect, the invention provides a method of installing a differential measuring device on a structural member, the method including the steps of providing a deflection measuring device according to the first aspect above, the transducer having at least a pair of apertures therethrough for securing the deflection measuring device to the structural member, providing a pair of apertures in the structural member for alignment with the pair of apertures in the deflection measuring device, providing a counter-bore in the surface of the structural member about each of the pair of apertures therethrough, providing a spacer element about each bolt shaft circumference and in contact therewith, securing the deflection measuring device to the structural member by passing a bolt and spacer element assembly through each of the apertures in the deflection measuring device and in the structural member such that each spacer element is in contact with the counter-bore surface, the transducer surface and the bolt shaft circumference.

In embodiments of the fifth aspect, the transducer comprises a further pair of apertures therethrough for securing the deflection measuring device to the structural member. In such embodiments, the method further comprises the steps of providing a further pair of apertures in the structural member for alignment with the further pair of apertures in the deflection measuring device. Further, the method comprises the steps of providing a counter-bore in the surface of the structural member about each of the further pair of apertures therethrough.

Throughout the description and claims of this specification, the words "comprise" and "contain" and variations of the words, for example "comprising" and "comprises", means "including but not limited to", and is not intended to (and does not) exclude other components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Embodiments of the present invention will now be described, by way of example only, with reference to the accompanying drawings in which:

FIG. 2a depicts a deflection measuring device according to an embodiment of the first aspect of the invention;

FIG. 2b depicts the deflection measuring device of FIG. 2a upon application of a vertical deflection thereto;

FIG. 3a shows the flexure elements of the deflection measuring device of FIG. 2a being subjected to an axial force;

FIG. 3b shows a load measuring assembly according to the second aspect of the invention wherein the deflection measuring device is being subjected to a torsional force;

FIG. 4 shows a structural member in the form of a railway rail to which a deflection measuring device according to the invention may be attached;

FIGS. 5a and 5b show a load measuring assembly according to the second aspect of the invention having a plurality of deflection measuring devices;

FIGS. 11a and 11b depict alternative spacer element configurations.

Figures 1A, 1B:
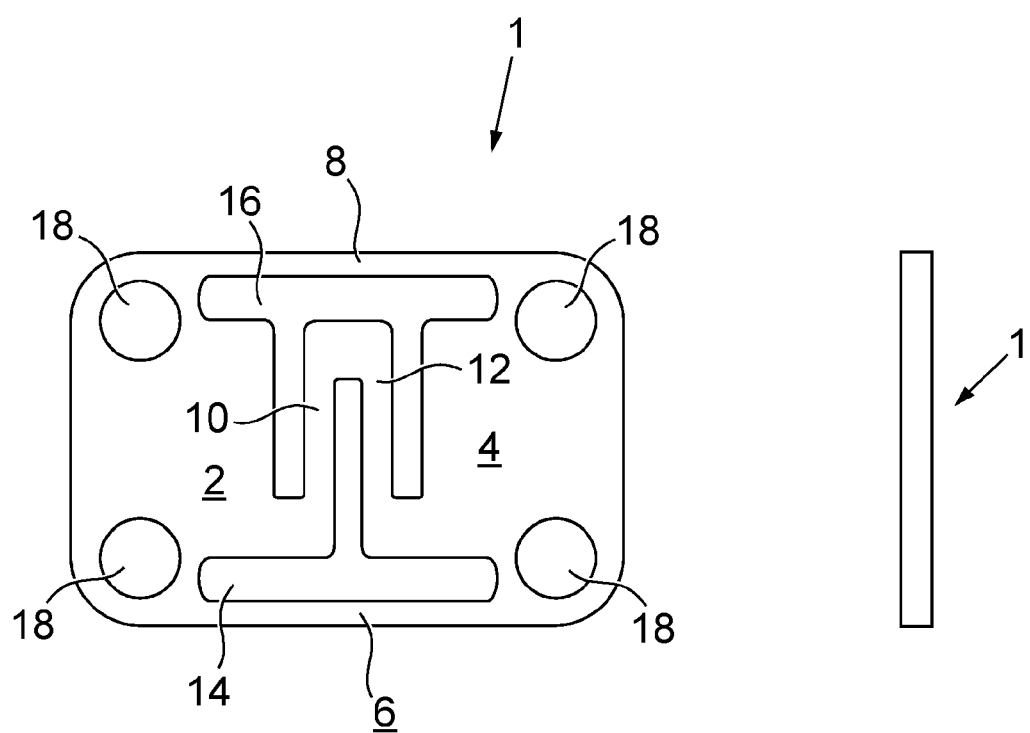
FIGS. 1a and 1b show a force transducer according to the prior art.

While the invention is susceptible to various modifications and alternative forms, specific embodiments thereof are shown by way of example in the drawings and will herein be described in detail. It should be understood that the drawings and detailed description thereto are not intended to limit the invention to the particular form disclosed, but on the contrary, the intention is to cover all modifications, equivalents and alternatives falling within the spirit and scope of the invention as defined by the appended claims.

Further, although the invention will be described in terms of specific embodiments, it will be understood that various elements of the specific embodiments of the invention will be applicable to all embodiments disclosed herein.

In the drawings, similar features are denoted by the same reference signs throughout.

Referring to FIG. 1a there is depicted a force transducer according to the prior art GB2216671A. A force transducer 1 comprises a block of material having a first loading member 2 and a second loading member 4, constrained to move in a predetermined direction under load by a first pair of flexure elements 6, 8. A force applied to the transducer, induces a shear stress between the loading members 2, 4 which in turn cause a bending moment in flexure elements 10, 12. The bending moment is detected and measured by strain gauges (not shown) affixed to the inner facing surfaces of flexure elements 10, 12. Through apertures 14, 16 complete the configuration of the transducer and bolt holes 18 allow bolts to pass therethrough for attachment of the transducer to a structural member (not shown). FIG. 1B shows an end plan view of the transducer of FIG. 1A. The transducer is configured to detect and measure shear strain occurring in a structural member under load. Due to constraint of the loading members, the transducer of FIG. 1 is forced to ignore any forces other than shear stresses occurring in the structural member.

FIGS. 2a and 2b depict an embodiment of a deflection measuring device 30 according to the first aspect of the invention. The device 30 has a transducer is the form of a block of material which measures vertical deflections by means of strain gauges 32a, 32b bonded to a pair of flexure elements 34, 36 or dual constant moment strain elements. The strain gauges 32a, 32b may be replaced by a displacement transducer in alternative embodiments not shown.

The depicted embodiment shows a beam which, when a load is applied thereto, is subject to shear force and bending force causing vertical deformation between Points 1 and 2. When measuring the vertical deformation between the two distinct points, Point 1 in the first loading member 38 and Point 2 in the second loading member 40, the measurement takes account of all of the causes of deformation in the beam such as bending, direct and shear stresses.

The differential vertical deflection between Point 1 and Point 2 is measured by measuring the displacement at Point 1 and at Point 2 and subtracting them to calculate the differential vertical deflection therebetween.

The embodiment depicted in FIGS. 2a and 2b shows a so-called twin strip transducer. The transducer is operable to convert a vertical load or displacement into a rotation of the central block 42.

The strain gauges on the inner surfaces of the flexure elements 34, 36 are subjected to a constant bending moment as the central block 42 is forced to rotate.

The block of material depicted has slots 44, 46, 48 cut into its top and bottom edges as best seen in FIG. 2a. The second loading member 40 is fixed to a fixture 33 and the first loading member 38 is then deflected vertically downwards, the resultant forces acting on the central block 42 causes the attached strain gauges 32a, 32b to be subjected to a constant bending moment. The deflected shape is represented in FIG. 2b.

The induced strain in the flexure elements 34, 36 is measured by the strain gauges 32a, 32b bonded to the inner faces and used as a means to measure the vertical deflection of "Point 1" relative to the fixed "Point 2" Angular deflection $A = x./d$ radians.

The device depicted in FIGS. 2a and 2b may form a cantilever measuring device and may be used as a pair of devices each having a force applied thereto.

As depicted in FIG. 3a, the deflection measuring device may have strain gauges 32a, 32b placed close to the neutral bending point 50 (measuring element centre). As best seen in the deflection measuring device of FIG. 3a, if a horizontal deflection is encountered (a change in rail tension for instance) the strain gauges 32a, 32b bonded to the inner faces of the flexure elements 34, 36 respond in a neutral way thus minimising measurement error.

As seen in FIG. 3b, in a load measuring assembly 60 according to the invention, when fixing a deflection measuring device having a transducer plate 61 onto a rail 62, dimensional imperfections in the fixing method or the rail 62 itself may result in the distortion of the transducer plate 61 itself. As the transducer plate 61 is relatively thin and the strain gauges (not shown) are positioned along the neutral bending point 64, small imperfections can be tolerated without corrupting the main measurement.

In certain applications of the deflection measuring device according to the invention, the device is configured but not restricted to the determination of wheel force on a railway rail.

Typically, when a rail itself is used as the prime measuring element in a wheel force measuring device, the mechanical strain within the rail is measured directly by strain gauges bonded directly to the rail or indirectly, by transferring the surface strain onto a secondary device fixed onto or inside the web of the rail (when fixed inside the web of the rail, the transferred strain is from the inside surface of the hole).

By contrast, the device of the invention measures the local vertical deflection between two discrete points and from this determines the force applied to the top of the rail.

As shown in FIG. 4, a rail 62 having a web portion 66 may be subject to an applied force F from a wheel 68, for example. The rail 62 is supported on sleepers 68. A measuring zone is formed between two sleepers 68, and a deflection measuring device of the invention is attached to the web 66 of the rail 62 to determine the forces occurring in the structural member at points 1 and 2 in response to the applied force F.

The device 61 is positioned on the web 66 of the rail 62 about the neutral axis of the rail 62 and is configured to be able to ignore horizontal and torsional deflections occurring in the rail and only resolve the vertical ones.

As best seen in FIG. 5a, the accuracy of force measurement can be increased by using two devices 61 operating differentially along an unsupported section of rail between two sleepers 68 making the exact positioning of the wheel 68 along the section of rail 62 (within the measuring section), a much reduced factor in the measurement.

Referring to FIG. 5b, inaccuracies due to side forces, which occur when a wheel applies load to the rail 62, can also be reduced by duplicating the differential measurement described above on the opposite side of the rail web 66 and summing the measurement outputs. In the embodiment shown, two pairs of devices 61 are located at opposing sides of the rail web 66 with each device of a pair being longitudinally spaced apart from one another along the length of the rail as shown in FIG. 5a.

Figure 6:
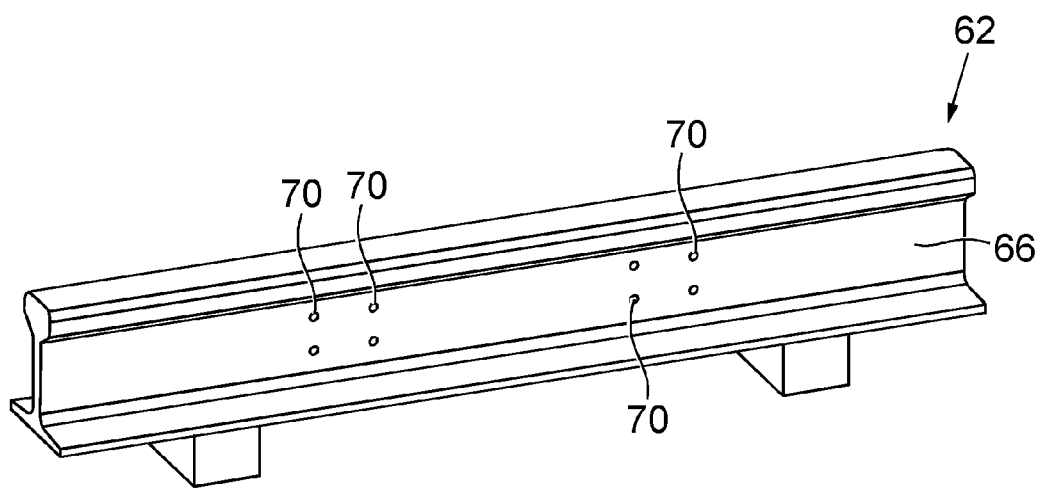
FIG. 6 shows an alternative structural member in the form of a railway rail to which a deflection measuring device according to the invention may be attached.

FIG. 6 depicts a rail 62 having bolt holes 70 machined therethrough. Each bolt hole receives a bolt which passes through the plate/block of material forming the transducer (not shown) so as to couple the transducer to the rail web 66. The bolt holes 70 are positioned such that the transducer is attached to the rail 62 at or about its neutral axis. In this way, horizontal and torsional forces acting on the transducer plate attached to the rail may be ignored for the purposes of measuring force applied to the rail 62.

A counter-bore is formed in the surface of the rail web 66 around the circumference of each bolt hole 70. The base of each counter-bore is perpendicular to the neutral axis of the rail 62. In this way, any imperfections, curvatures and/or irregularities in the surface of the rail web 66 about the bolt hole 70 is removed facilitating more accurate measurement of the applied force.

Figure 7:
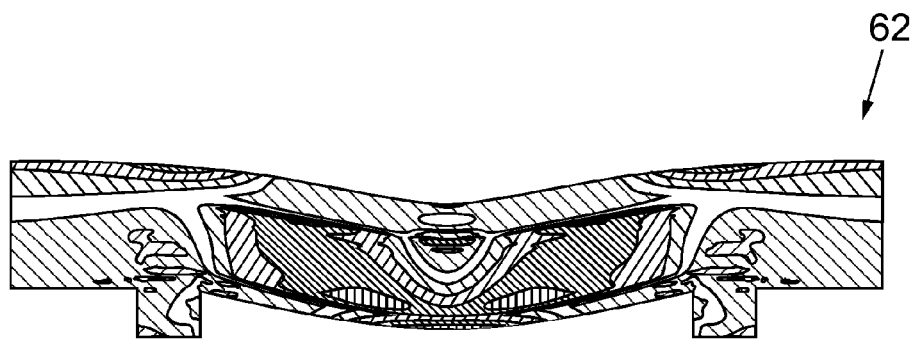
FIG. 7 shows the deflection profile in a rail upon application of a load thereto.

FIG. 7 depicts the forces and deformation occurring in the rail 62 in response to a load applied thereto. The forces are resolved into a vertical deflection in the loading members of a deflection measuring device (not shown) attached to the rail 62.

Figure 8:
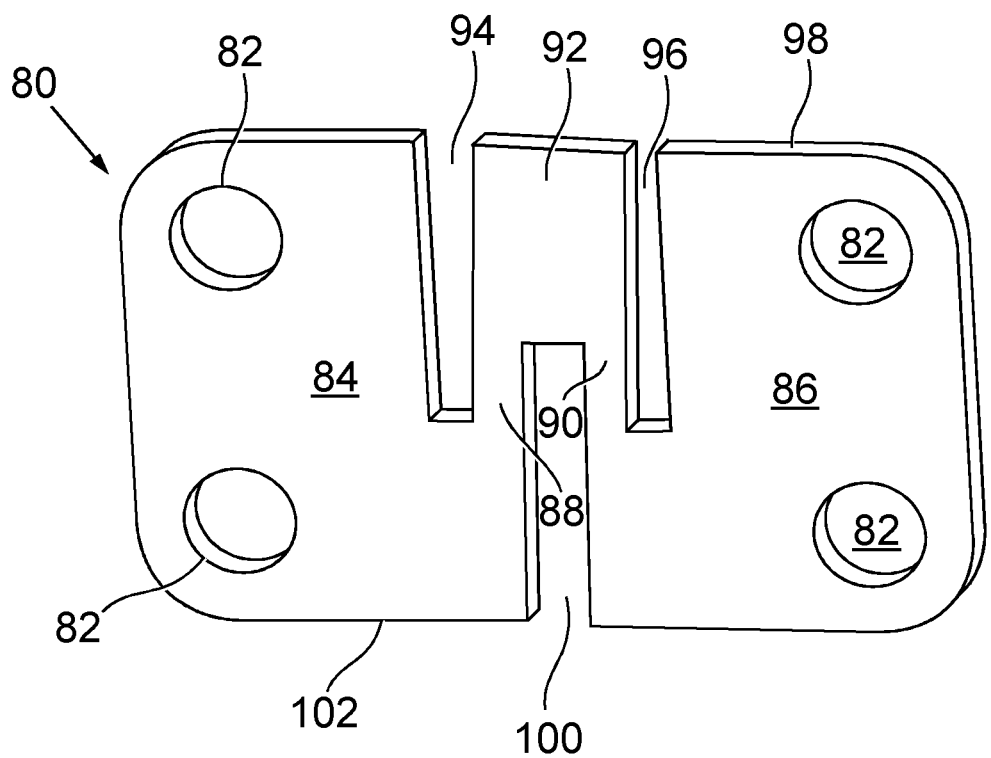
FIG. 8 shows a plate of a deflection measuring device according to an embodiment of the invention.

FIG. 8 shows a plate of a deflection measuring device according to an embodiment of the invention. The plate 80 forms part of a transducer attachable to a structural member, such as a rail or the like (not shown) through bolt holes 82. The plate 80 comprises a first loading member 84 and a second loading member 86 coupled together and capable of relative vertical and torsional deflection with respect to one another. A first flexure element 88 and a second flexure element 90 are coupled to the first and the second loading member 84, 86 respectively and connected to one another by a connecting portion 92. The first and second flexure elements 88, 90 are arranged to deform in response the relative vertical deflection between the first and the second loading members 84, 86. A strain responsive element in the form of a pair of strain gauges (not shown) are affixed to the inner faces of the first and second flexure elements 88, 90 and are operable to detect the deformation therein.

In use, the forces applied to the plate 80 are resolved into a differential vertical displacement between first and second points on the plate 80. The vertical displacement is resolved into deformation of the flexure elements 88, 90 which deformation is detected and measured by the strain gauges (not shown).

The plate 80 has a pair of parallel elongate recesses 94, 96 in and perpendicular to a top edge 98 of the plate and an elongate recess 100 in and perpendicular to an opposing bottom edge 102 thereof. The recesses 94, 96, 100 are configured so as to form the two loading members 84, 86 the first and second flexure elements 88, 90 and the connecting portion 92.

In this arrangement, the loading members 84, 86 of the transducer are unconstrained against torsional, bending and shear forces relative to one another. As a result, the transducer is arranged to resolve all forces acting on the loading members 84, 86 and is not limited to measuring only shear strain between the loading members.

Figure 9:
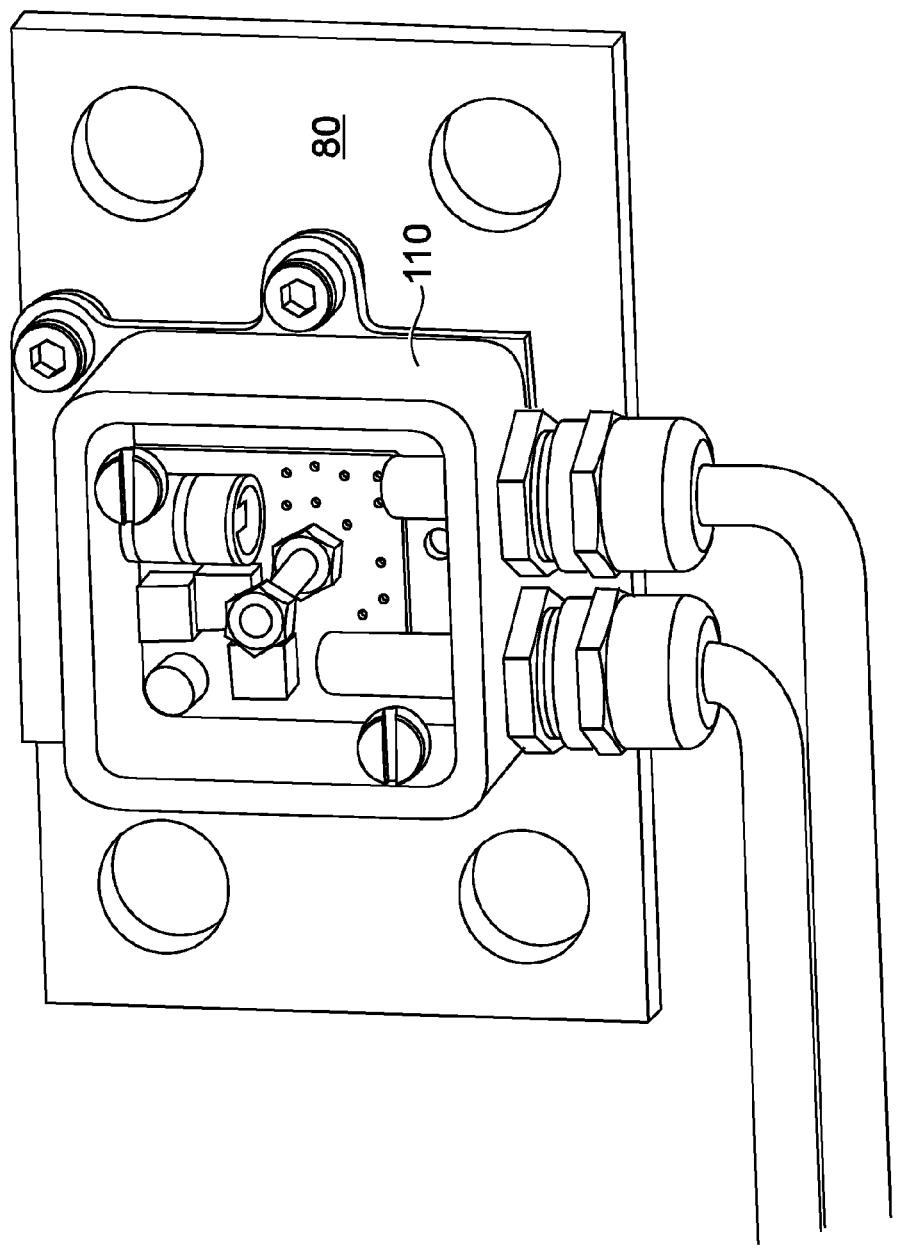
FIG. 9 shows the plate of FIG. 8 having an electronics unit attached thereto.

FIG. 9 shows the plate of FIG. 8 with an electronics module operably attached thereto. The plate 80 has an electronics unit 110 attached thereto, which electronics unit 110 comprises a Wheatstone bridge formed of the outputs of the strain gauges (not shown) affixed to the flexure elements of the plate. The outputs from the Wheatstone bridge are connected to a processor which calculates the load applied to the rail or other structural member to which the plate 80 is attached.

Figure 10B:
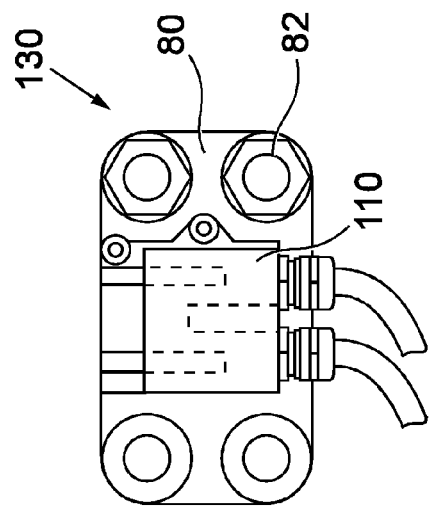
FIGS. 10a to 10f depicts a structural member and a deflection measuring kit for assembly to form a deflection measuring device according to the fourth aspect of the present invention.
Figure 10A:
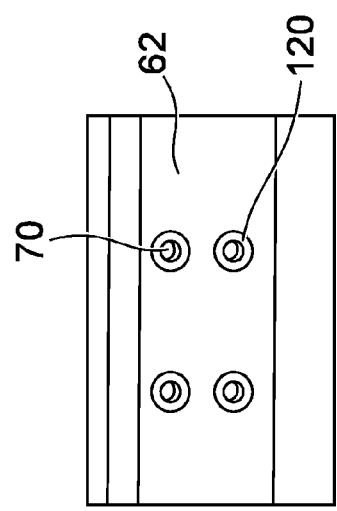
Figure 10C:
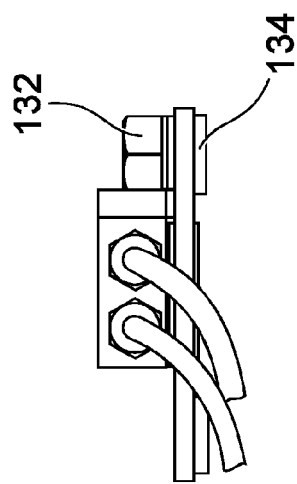
Figure 10D:
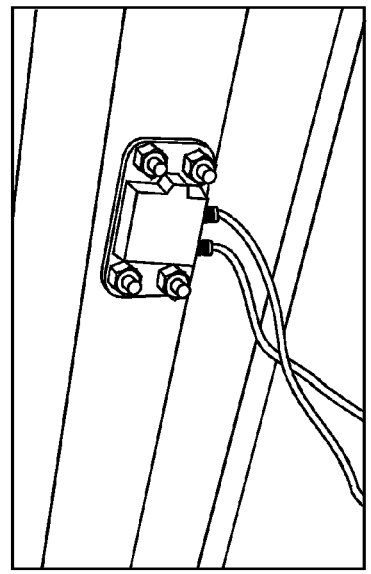

FIGS. 10a to 10f depicts a structural member and a deflection measuring kit for assembly to form a deflection measuring device according to the fourth aspect of the present invention. FIG. 10a shows a rail 62 having four bolt holes 70 drilled therethrough. Each bolt hole 70 having a counter-bore 120 formed around its circumference in the surface of the web 66 of the rail 62. FIG. 10b shows a deflection measuring device 130 having a plate 80 and an electronics unit 110. The device 130 is attached to the rail 62 by bolts passing through each bolt hole 82 in plate 80 into the bolt holes 70 in the rail 62. Referring to FIG. 10c, the plate 80 is spaced apart from the surface of the rail 62 by spacer elements about each bolt in the form of washers 134. Each washer is in intimate contact with the bolt shaft circumference and has a planar, annular surface for contacting the base of the counter-bore 120 in the rail web 66. FIG. 10d depicts the device 130 in position on a rail web 66. Four bolts attach the plate 130 to the rail web 66.

Figure 10E:
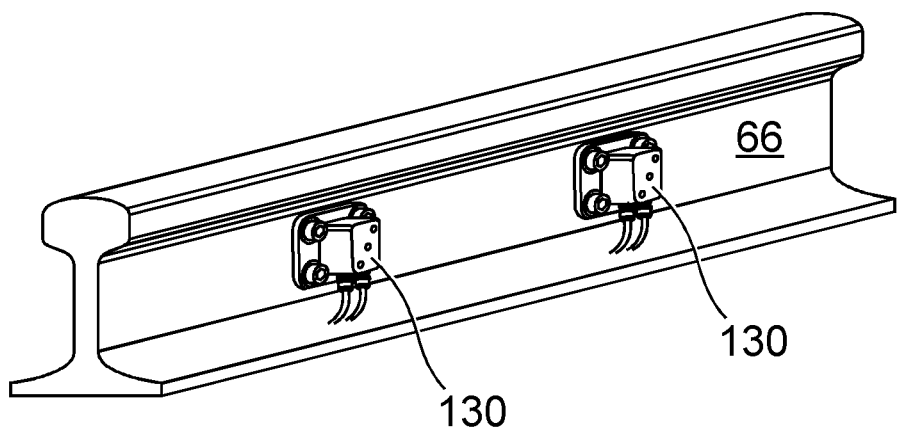

FIG. 10e shows two devices 130 longitudinally spaced apart from one another along the length of a rail 62. Each device is attached to the web 66 of the rail as described above with reference to FIGS. 10a to 10d.

Figure 10F:
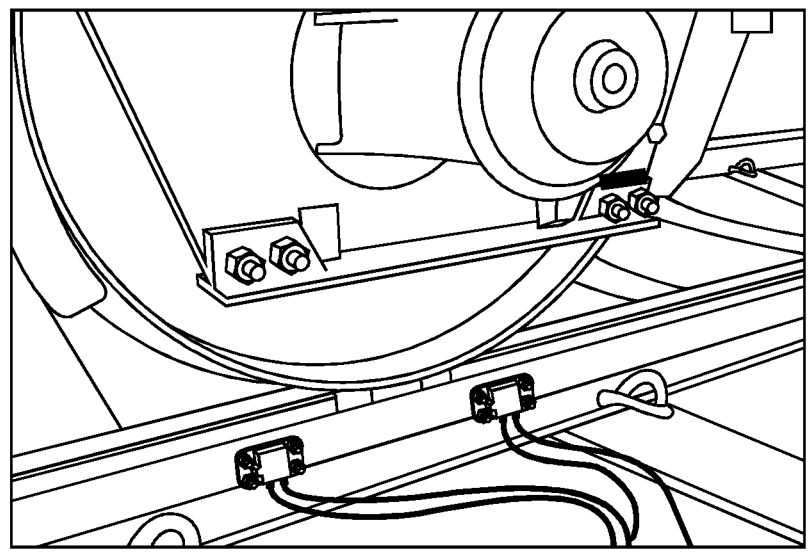

FIG. 10f shows a wheel force applied to the load measuring assembly of FIG. 10e.

FIG. 11a depicts a spacer element in the form of washer 134a. The washer has a discontinuous annular portion 136 having a break 138 therein. The break 138 allows the diameter of the annular portion 136 to be increased or decreased as the washer 134a is press fit onto the shaft of a bolt (not shown). The annular portion 136 is resiliently biased and will intimately contact the bolt shaft circumference and remain in contact therewith in use. The washer 134a has a planar surface 140 which, in use, is in complete and continuous contact with the base surface of the counter-bore formed in the surface of the rail.

FIG. 11b depicts an alternative spacer element in the form of washer 134b. The washer 134b has a discontinuous annular planar surface 140a, which, in use, is in contact with the base surface of the counter-bore formed in the surface of the rail.

Modifications and improvements may be made to the forgoing without departing from the scope of the present invention as defined by the claims.

The invention claimed is:

1. A deflection measuring device for measuring differential vertical deflection between first and second discrete points in response to the application of force to the device, the device comprising a transducer attachable to a structural member and comprising at least one strain responsive element, the transducer being operable to resolve any force applied thereto into a differential vertical deflection between a first point and a second point on the transducer when a load is applied thereto; the strain responsive element being operable to measure the differential vertical deflection in the transducer.

2. A deflection measuring device according to claim 1, wherein the transducer is unconstrained against shear, bending and torsional deflection.

3. A deflection measuring device according to claim 1, wherein the transducer comprises a first loading member and a second loading member coupled together and capable of relative vertical and torsional deflection with respect to one another, a first flexure element and a second flexure element coupled to the first and the second loading member respectively and connected to one another by a connecting portion and being arranged to deform in response to the relative vertical deflection between the first and the second loading members.

4. A deflection measuring device according to claim 3, wherein such the strain responsive element is coupled to the first and second flexure elements and is operable to detect the deformation therein.

5. A deflection measuring device according to claim 1, wherein the transducer is formed of a plate or a block of material attachable to a structural member.

6. A deflection measuring device according to claim 5, wherein the plate or the block of material is formed with the first and the second loading members coupled together by first and second flexure elements united by a connecting portion at one of their ends and each being connected to a respective loading member at the other of their ends.

7. A deflection measuring device according to claim 6, wherein the block of material or plate further comprises a pair of parallel elongate recesses in and perpendicular to a top edge of the block of material or plate and an elongate recess in and perpendicular to an opposing bottom edge thereof, the recesses being configured so as to form the two loading members coupled together by first and second flexure elements united by a connecting portion at one of their ends and each of which are connected to a respective loading member at the other of their ends.

8. A deflection measuring device according to claim 1, wherein the strain responsive element is a displacement transducer.

9. A deflection measuring device according to claim 1, wherein the strain responsive element is a strain gauge.

10. A load measuring assembly comprising a deflection measuring device and a structural member to which the deflection measuring device is attached, the deflection measuring device comprising a transducer attached to the structural member and comprising at least one strain responsive element, the transducer being operable to resolve any force applied thereto from the structural member into a differential vertical deflection between a first point and a second point on the transducer when a load is applied thereto; the strain responsive element being operable to measure the differential vertical deflection in the transducer.

11. A railroad rail assembly including a rail and a load measuring assembly according to claim 10 attached to a side of the rail.

12. A load measuring assembly according to claim 10, wherein the transducer is attached to the structural member by a coupling element.

13. A load measuring assembly according to claim 12, wherein the coupling element comprises a plurality of bolts.

14. A load measuring assembly according to claim 10, further comprising a spacer element between the transducer and the structural member.

15. A load measuring assembly according to claim 14, wherein the spacer element is in contact with a coupling element between the transducer and the structural member.

16. A load measuring assembly according to claim 13, wherein the structural member comprises a plurality of apertures therethrough for receiving the plurality of bolts, each aperture being circumscribed by a counter-bore in the surface of the structural member.

17. A load measuring assembly according to claim 10, comprising a first deflection measuring device and a second deflection measuring device attached on or about the neutral axis of the structural member and longitudinally spaced apart from one another, each of said first and said second deflection measuring device comprising at least one strain responsive element operable to detect a vertical deflection in the transducer resulting from a force applied to the structural member.

18. A load measuring assembly according to claim 10, wherein the structural member is a rail.

19. A load measuring assembly according to claim 10, wherein the load measuring assembly is an axle load measuring assembly for a railway.

20. A load measuring assembly according to claim 19, wherein the axle load measuring assembly comprises two pairs of differential deflection measuring devices located in predetermined spaced configuration along the railway, each differential deflection measuring device of each pair being located together in side by side relation, one on each rail secured to the web thereof.

21. A deflection measuring kit for assembly to form a deflection measuring device for measuring differential vertical deflection between first and second discrete points in response to the application of force to the device from a structural member, the kit comprising four nuts and bolts, a transducer formed of a block of material and having four bolt holes therethrough and at least one strain responsive element affixed to the block of material, four structural member spacer elements each having an annular surface to contact the structural member and the bolt shaft circumference of one of said bolts.

22. A method of measuring a load applied to a structural member, the method comprising the steps of providing a deflection measuring device according to claim 1, attaching the deflection measuring device on or about the neutral axis of a structural member, applying a load to the structural member thereby inducing a differential vertical deflection between first and second points on the transducer of the differential measuring device, measuring the differential vertical deflection in the transducer using a strain responsive element and determining the applied load from the output of the strain responsive element.

23. A method of installing a differential measuring device on a structural member, the method including the steps of providing a deflection measuring device according to claim 1, the transducer having at least a pair of apertures therethrough for securing the deflection measuring device to the structural member, providing a pair of apertures in the structural member for alignment with the pair of apertures in the deflection measuring device, providing a counter-bore in the surface of the structural member about each of the pair of apertures therethrough, providing a spacer element about each bolt shaft circumference and in contact therewith, securing the deflection measuring device to the structural member by passing a bolt and spacer element assembly through each of the apertures in the deflection measuring device and in the structural member such that each spacer element is in contact with the counter-bore surface, the transducer surface and the bolt shaft circumference.

24. A device, comprising:
means for measuring differential vertical deflection between first and second discrete points in response to the application of force to the device, wherein the means is operable to resolve any force applied thereto into a differential vertical deflection between a first point and a second point when a load is applied and being operable to measure the differential vertical deflection in the means.

25. A load measuring assembly, comprising:
means for measuring differential vertical deflection between first and second discrete points in response to the application of force to the device, wherein the means is operable to resolve any force applied thereto into a differential vertical deflection between a first point and a second point when a load is applied and being operable to measure the differential vertical deflection in the means,
wherein the means includes a strain responsive element.

26. An axle load measuring assembly, comprising:
means for measuring differential vertical deflection between first and second discrete points in response to the application of force to the device, wherein the means is operable to resolve any force applied thereto into a differential vertical deflection between a first point and a second point when a load is applied and being operable to measure the differential vertical deflection in the means.

27. A deflection measuring kit, comprising:
  means for measuring differential vertical deflection between first and second discrete points in response to the application of force to the device, wherein the means is operable to resolve any force applied thereto into a differential vertical deflection between a first point and a second point when a load is applied and being operable to measure the differential vertical deflection in the means.

28. A method of measuring a load applied to a structural member, comprising:
  step for measuring differential vertical deflection between first and second discrete points in response to the application of force to the device, wherein the step resolves any force applied during the step into a differential vertical deflection between a first point and a second point when a load is applied such that the step is operable to measure the differential vertical deflection.

* * * * *